US011711007B2

(12) United States Patent
Stockstad et al.

(10) Patent No.: US 11,711,007 B2
(45) Date of Patent: Jul. 25, 2023

(54) HARVESTING RINGING ENERGY USING A BOOTSTRAP CIRCUIT

(71) Applicant: Qualcomm Incorporated, San Diego, CA (US)

(72) Inventors: Troy Lynn Stockstad, Chandler, AZ (US); Yi-Cheng Wan, Singapore (SG); Marko Koski, Chandler, AZ (US); Ajay Kumar Kosaraju, Singapore (SG)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/315,444

(22) Filed: May 10, 2021

(65) Prior Publication Data

US 2022/0360159 A1 Nov. 10, 2022

(51) Int. Cl.
*H02M 1/08* (2006.01)
*H02M 1/00* (2006.01)
H02M 3/156 (2006.01)
H02M 3/158 (2006.01)

(52) U.S. Cl.
CPC ........... *H02M 1/0006* (2021.05); *H02M 1/08* (2013.01); *H02M 3/156* (2013.01); *H02M 3/1582* (2013.01)

(58) Field of Classification Search
CPC ............................ H02M 1/0006; H02M 1/08
See application file for complete search history.

(56) References Cited

U.S. PATENT DOCUMENTS

2008/0278135 A1 11/2008 De Lima Filho et al.
2014/0232189 A1* 8/2014 Gasparini ............ H02M 3/158
307/31
2020/0153338 A1 5/2020 Ribarich et al.

FOREIGN PATENT DOCUMENTS

CN 1914787 A * 2/2007 .......... H02M 3/1588

OTHER PUBLICATIONS

International Search Report and Written Opinion—PCT/US2022/071674—ISA/EPO—dated Jul. 18, 2022, 15 pages.

* cited by examiner

*Primary Examiner* — Kyle J Moody
*Assistant Examiner* — Jye-June Lee
(74) *Attorney, Agent, or Firm* — Colby Nipper

(57) ABSTRACT

An apparatus is disclosed for harvesting ringing energy. In an example aspect, the apparatus includes a bootstrap circuit. The bootstrap circuit includes a bootstrap capacitor and a bootstrap switch. The bootstrap switch includes a first terminal configured to accept an input voltage. The bootstrap switch also includes a second terminal coupled to the bootstrap capacitor. The bootstrap switch additionally includes a body diode comprising an anode coupled to the first terminal and a cathode coupled to the second terminal. The bootstrap switch is configured to be in an open state to charge the bootstrap capacitor via the body diode. The bootstrap switch is also configured to provide a voltage at the second terminal of the bootstrap switch. The voltage is greater than an average of the input voltage.

30 Claims, 9 Drawing Sheets

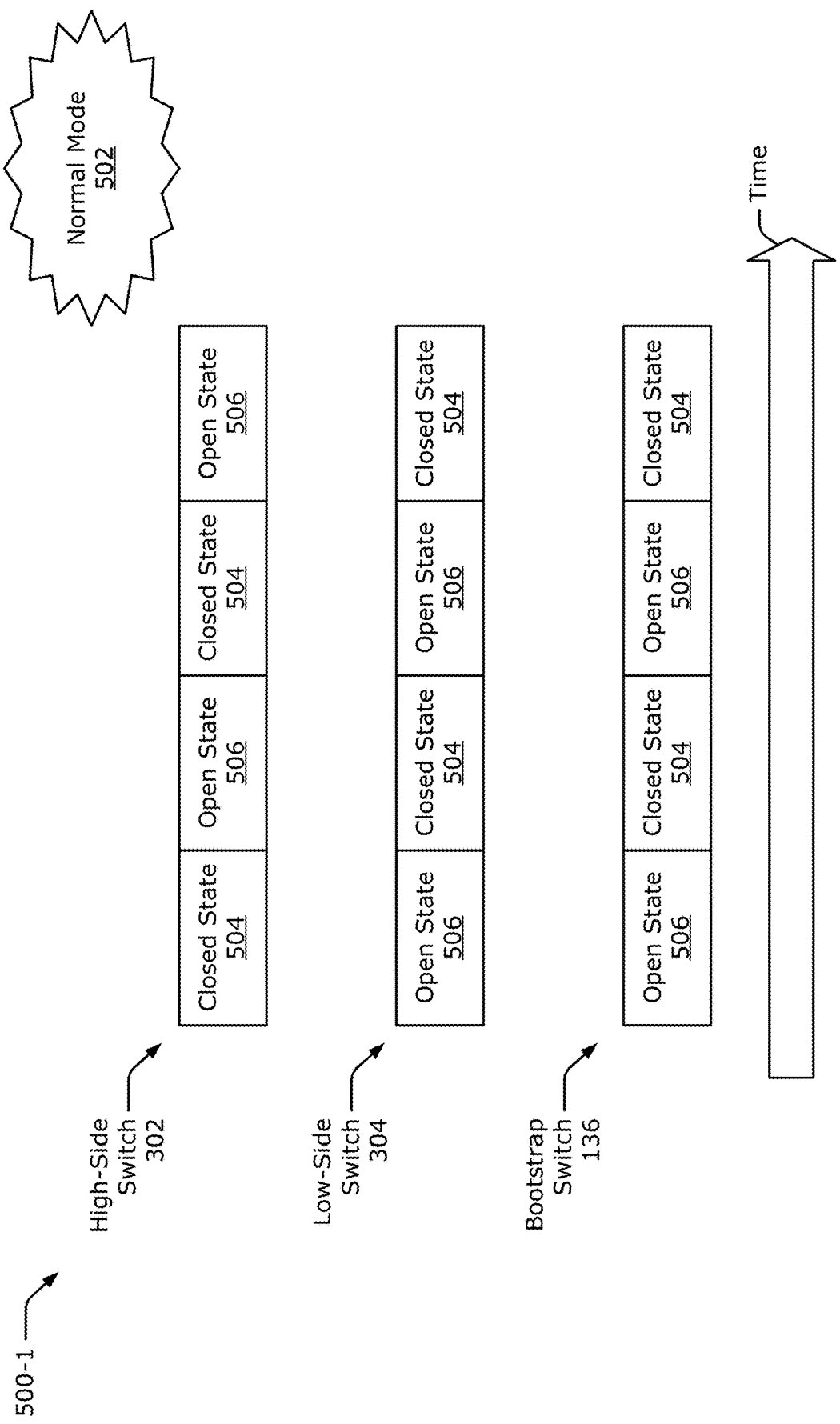

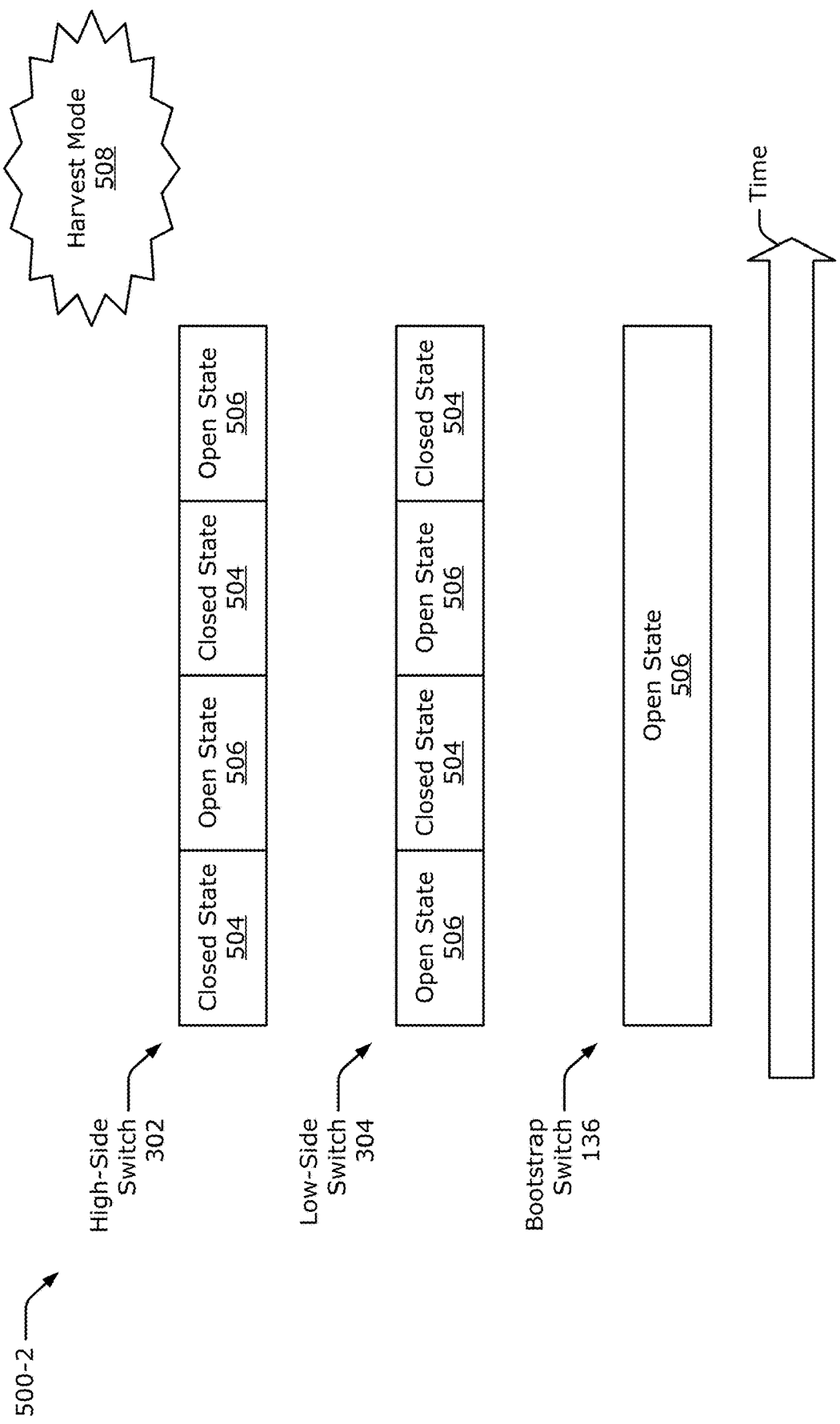

800

```
┌─────────────────────────────────────────┐
│ Accept an input voltage at a first      │
│ terminal of a bootstrap switch of a     │
│ bootstrap circuit                        │
│                   802                   │
└─────────────────────────────────────────┘
                    ↓
┌─────────────────────────────────────────┐
│ Cause the bootstrap switch to be in an  │
│ open state                              │
│                   804                   │
└─────────────────────────────────────────┘
                    ↓
┌─────────────────────────────────────────┐
│ Charge, based on the bootstrap switch   │
│ being in the open state, a bootstrap    │
│ capacitor of the bootstrap circuit      │
│ using a body diode of the bootstrap     │
│ switch, the body diode comprising an    │
│ anode coupled to the first terminal     │
│ and a cathode coupled to a second       │
│ terminal of the bootstrap switch, the   │
│ bootstrap capacitor coupled to the      │
│ second terminal of the bootstrap switch │
│                   806                   │
└─────────────────────────────────────────┘
                    ↓
┌─────────────────────────────────────────┐
│ Provide, based on the charging, a       │
│ voltage at the second terminal of the   │
│ bootstrap switch, the voltage greater   │
│ than an average of the input voltage    │
│                   808                   │
└─────────────────────────────────────────┘
```

HARVESTING RINGING ENERGY USING A BOOTSTRAP CIRCUIT

TECHNICAL FIELD

This disclosure relates generally to switch-mode power supplies and, more specifically, to improving performance of switch-mode power supplies by harvesting ringing energy.

BACKGROUND

Batteries are reliable, portable energy sources that are used by a wide range of electronic devices including mobile phones, laptops, toys, power tools, medical device implants, electronic vehicles, and satellites. A battery, however, stores a fixed amount of charge that is depleted during mobile operation of the electronic device. Instead of requiring the purchase of a replacement, many batteries are rechargeable via another power source. The same battery can therefore be used multiple times.

An electronic device can include a switch-mode power supply to transfer power from a power source, such as the battery, to other components of the electronic device. It can be challenging to design a switch-mode power supply to maintain efficiency across various voltages of the battery. Consequently, the switch-mode power supply may be unable to supply a desired current in situations in which, for example, the battery is depleted and has a smaller voltage.

SUMMARY

An apparatus is disclosed that harvests ringing energy. Described example techniques implement a bootstrap circuit with a bootstrap switch and a bootstrap capacitor. The bootstrap switch is implemented with a transistor having a body diode (e.g., an internal or parasitic diode) that enables the bootstrap switch to optionally operate as a rectifier (e.g., a diode). While the bootstrap switch is operating as the rectifier, the bootstrap circuit harvests ringing energy that occurs across the switch-mode power supply. The bootstrap circuit uses the ringing energy to charge the bootstrap capacitor. This enables the bootstrap circuit to provide a switching circuit of the switch-mode power supply with a supply voltage that is greater than an input voltage to the switch-mode power supply. By harvesting the ringing energy, the switch-mode power supply can operate at higher efficiencies and can supply a desired amount of current for lower input voltages as compared to other switch-mode power supplies.

In an example aspect, an apparatus is disclosed. The apparatus includes a bootstrap circuit. The bootstrap circuit includes a bootstrap capacitor and a bootstrap switch. The bootstrap switch includes a first terminal configured to accept an input voltage. The bootstrap switch also includes a second terminal coupled to the bootstrap capacitor. The bootstrap switch additionally includes a body diode comprising an anode coupled to the first terminal and a cathode coupled to the second terminal. The bootstrap switch is configured to be in an open state to charge the bootstrap capacitor via the body diode. The bootstrap switch is also configured to provide a voltage at the second terminal of the bootstrap switch. The voltage is greater than an average of the input voltage.

In an example aspect, an apparatus is disclosed. The apparatus includes a bootstrap circuit. The bootstrap circuit includes capacitance means for storing energy. The bootstrap circuit also includes switching means for charging the capacitance means. The switching means includes a first terminal configured to accept an input voltage. The switching means also includes a second terminal coupled to the capacitance means. The switching means additionally includes rectification means for charging the capacitance means based on the switching means being in an open state and providing a voltage at the second terminal that is greater than an average of the input voltage.

In an example aspect, a method for harvesting ringing energy is disclosed. The method includes accepting an input voltage at a first terminal of a bootstrap switch of a bootstrap circuit. The method also includes causing the bootstrap switch to be in an open state. The method additionally includes charging, based on the bootstrap switch being in the open state, a bootstrap capacitor of the bootstrap circuit using a body diode of the bootstrap switch. The body diode comprises an anode coupled to the first terminal and a cathode coupled to a second terminal of the bootstrap switch. The bootstrap capacitor is coupled to the second terminal of the bootstrap switch. The method further includes providing, based on the charging, a voltage at the second terminal of the bootstrap switch. The voltage is greater than an average of the input voltage.

In an example aspect, a switch-mode power supply is disclosed. The switch-mode power supply includes a switching circuit and a bootstrap circuit. The switching circuit includes a switch and a driver. The switch includes a first terminal, a second terminal, and a third terminal. The driver includes a positive supply terminal, a negative supply terminal coupled to the second terminal of the switch, and an output terminal coupled to the third terminal of the switch. The bootstrap circuit includes a bootstrap capacitor and a bootstrap switch. The bootstrap capacitor has a first terminal coupled to the positive supply terminal of the driver and a second terminal coupled to the second terminal of the switch and the negative supply terminal of the driver. The bootstrap switch includes a first terminal, a second terminal, and a body diode coupled between the first terminal and the second terminal. The first terminal is coupled to the first terminal of the switch. The second terminal is coupled to the first terminal of the bootstrap capacitor and the positive supply terminal of the driver. The bootstrap switch is configured to be in an open state based on the switch being in the open state.

BRIEF DESCRIPTION OF DRAWINGS

FIG. 5-1 illustrates an example state diagram of a high-side switch, a low-side switch, and a bootstrap switch during a normal mode.

FIG. 5-2 illustrates an example state diagram of a high-side switch, a low-side switch, and a bootstrap switch during a harvest mode.

FIG. 8 is a flow diagram illustrating an example process for harvesting ringing energy.

DETAILED DESCRIPTION

An electronic device can include a switch-mode power supply (SMPS) to transfer power from a power source, such as a battery, to other components of the electronic device. It can be challenging to design a switch-mode power supply to maintain efficiency across various voltages of the battery. In some situations, the switch-mode power supply may be unable to supply a desired current like if the battery is depleted and has a reduced voltage.

Some switch-mode power supplies use an n-channel metal-oxide-semiconductor field-effect transistor (NMOS-FET) as a high-side switch. A size of the NMOSFET can be smaller than a p-channel metal-oxide-semiconductor field-effect transistor (PMOSFET) that can pass a similar amount of current. As such, the NMOSFET can be a cheaper alternative to using the PMOSFET. However, to operate the NMOSFET as a switch, the switch-mode power supply has to drive the NMOSFET with a gate voltage that is greater than the supply voltage, while the PMOSFET gate voltage is driven lower than the supply voltage to turn the device on. In particular, this gate voltage is greater than or equal to a summation of a drain voltage of the NMOSFET and a threshold voltage of the NMOSFET to cause the NMOSFET to operate as a switch in a closed state. In some situations, an input voltage provided to the switch-mode power supply may be insufficient to drive the NMOSFET to achieve a closed state in which current can flow from the battery to the other components of the device.

To address this challenge, example techniques for harvesting ringing energy are described herein. The described techniques implement a bootstrap circuit with a bootstrap switch and a bootstrap capacitor. The bootstrap switch is realized with a transistor having a body diode (e.g., an internal or parasitic diode). The body diode enables the bootstrap switch to optionally operate as a rectifier (e.g., a diode). While the bootstrap switch is operating as the rectifier, the bootstrap circuit harvests ringing energy that occurs across the switch-mode power supply. The bootstrap circuit uses the ringing energy to charge the bootstrap capacitor. This enables the bootstrap circuit to provide a switching circuit of the switch-mode power supply with a supply voltage that is greater than an input voltage to the switch-mode power supply. By harvesting the ringing energy, the switch-mode power supply can operate at higher efficiencies and can supply a desired amount of current for lower input voltages as compared to other switch-mode power supplies.

Figure 1:
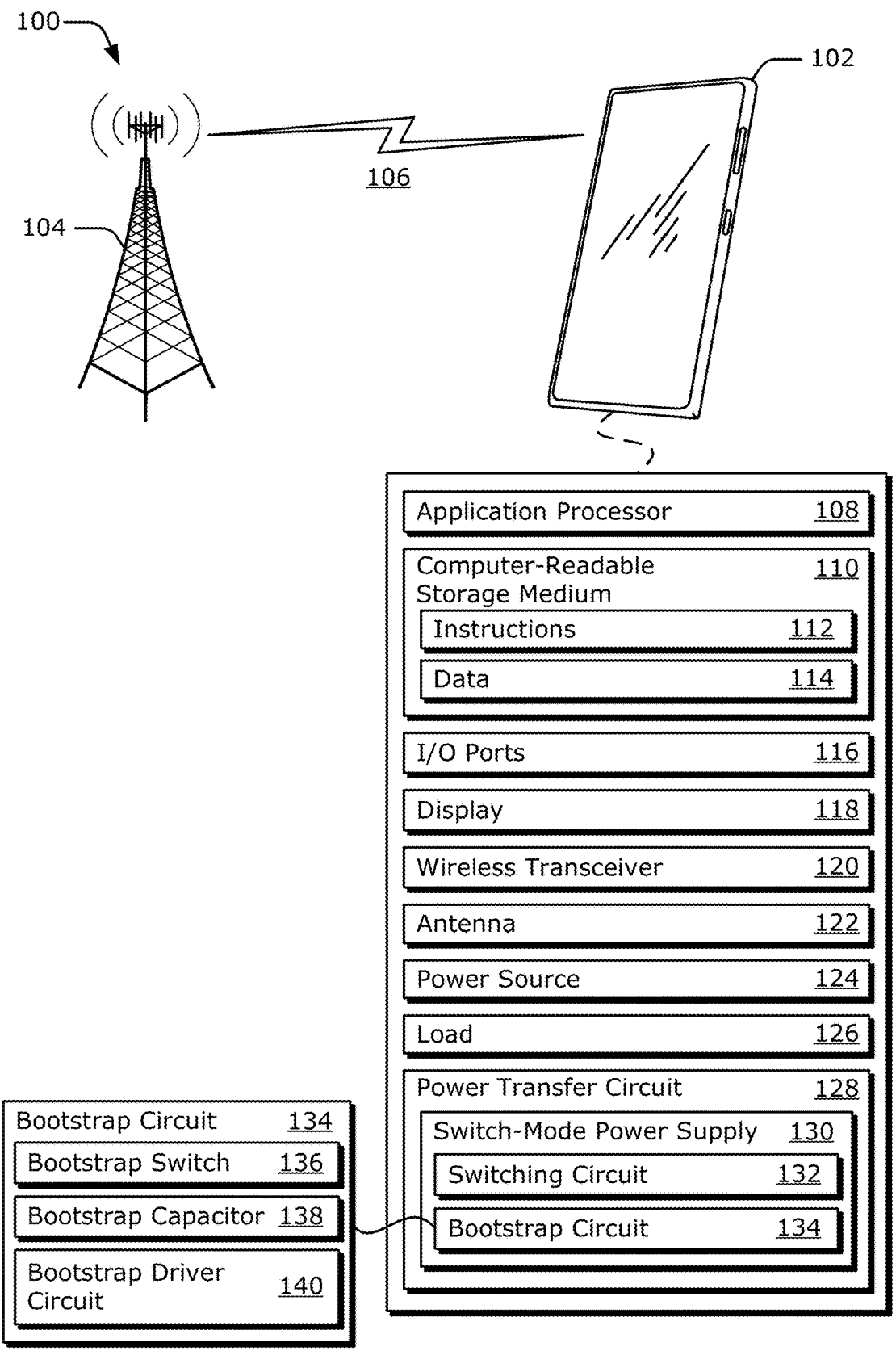
FIG. 1 illustrates an example operating environment for harvesting ringing energy.

FIG. 1 illustrates an example environment 100 for harvesting ringing energy. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device with a wireless interface, such as a satellite, a server device, a terrestrial television broadcast tower, an access point, a peer-to-peer device, a mesh network node, and so forth. Therefore, the computing device 102 may communicate with the base station 104 or another device via wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular; IEEE 802.11 (e.g., Wi-Fi®); IEEE 802.15 (e.g., Bluetooth®); IEEE 802.16 (e.g., WiMAX®); and so forth. In some implementations, the wireless link 106 may wirelessly provide power and the base station 104 may include a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented.

A wireless transceiver 120 of the computing device 102 provides connectivity to respective networks and other electronic devices connected therewith. The wireless transceiver 120 can facilitate communication over any suitable type of wireless network, such as a wireless local area network (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via an antenna 122. Components of the wireless transceiver 120 can include amplifiers, switches, mixers, analog-to-digital converters, filters, and so forth for conditioning the communication signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antenna 122.

The computing device 102 also includes at least one power source 124, at least one load 126, and at least one power transfer circuit 128. The power source 124 can represent a variety of different types of power sources, including a wired power source, a solar charger, a portable charging station, a wireless charger, a battery, and so forth. Depending on the type of computing device 102, the battery may include a lithium-ion battery, a lithium polymer battery, a nickel-metal hydride battery, a nickel-cadmium battery, a lead acid battery, and so forth. In some cases, the battery can include multiple batteries, such as a main battery and a supplemental battery, and/or multiple battery cell combinations.

The power transfer circuit 128 transfers power from the power source 124 to one or more loads 126 of the computing device 102. Generally, the power level provided via the power transfer circuit 128 and the power source 124 is at a level sufficient to power the one or more loads 126. For example, the power level may be on the order of milliwatts (mW) for powering loads associated with a smartphone or on the order of watts to kilowatts (kW) for powering loads associated with an electric vehicle. Example types of loads include a variable load, a load associated with a component of the computing device 102 (e.g., the application processor 108, an amplifier within the wireless transceiver 120, the display 118, a battery, or a power converter), a load that is external from the computing device 102 (e.g., another battery), and so forth. The power transfer circuit 128 can be a stand-alone component or integrated within another component, such as a power management integrated circuit (PMIC) (not shown).

Figure 2:
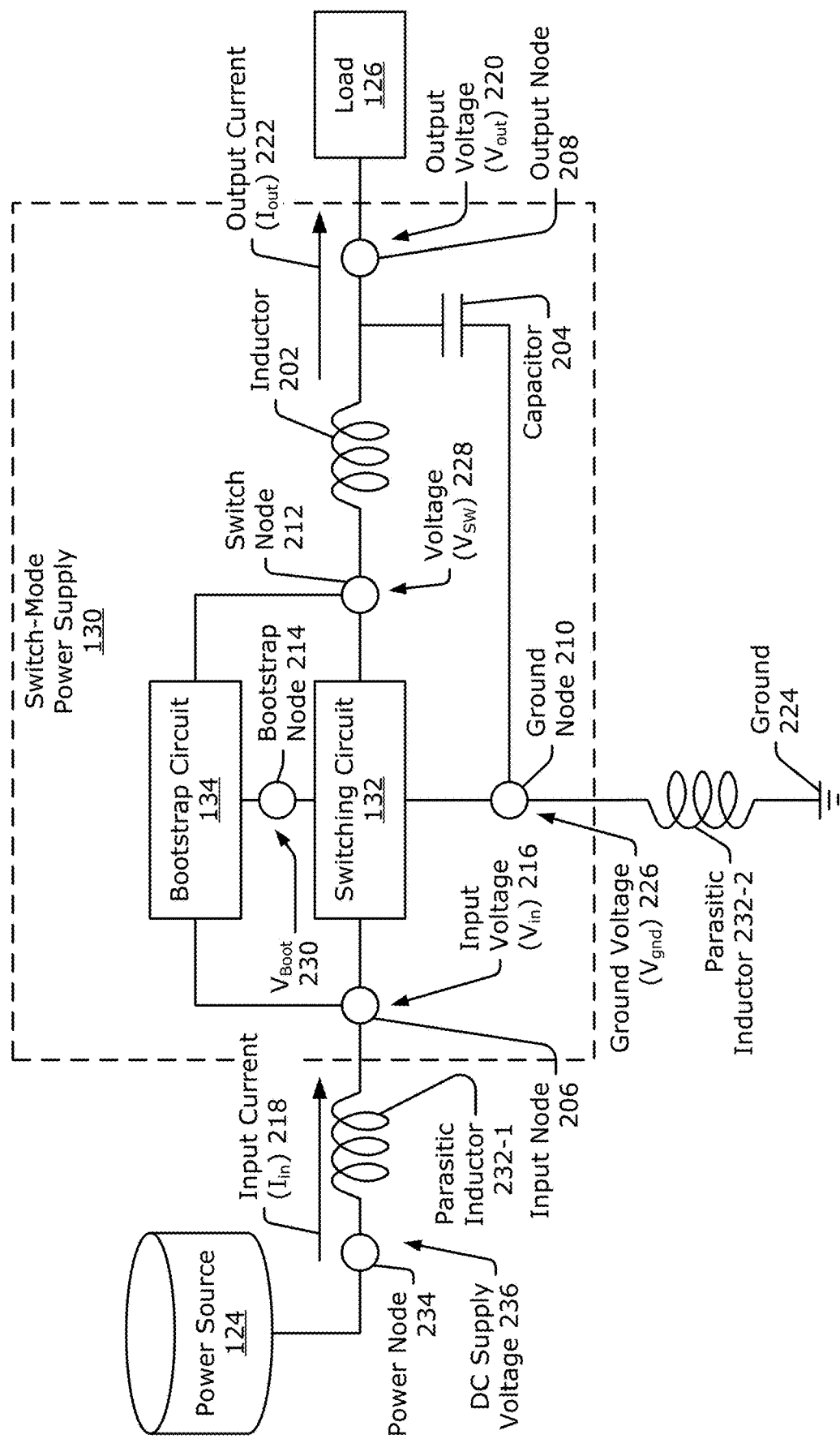
FIG. 2 illustrates an example power source, an example load, and an example switch-mode power supply for harvesting ringing energy.

The power transfer circuit 128 includes at least one switch-mode power supply 130, which can be implemented as a buck power converter (e.g., a buck converter or a buck regulator), a buck-boost power converter (e.g., a buck-boost converter or a buck-boost regulator), and so forth. The switch-mode power supply 130 includes at least one switching circuit 132 to enable DC-to-DC power conversion. In addition to the switching circuit 132, the switch-mode power supply 130 can include other energy storage components, including at least one inductor and at least one capacitor (examples of which are shown in FIG. 2).

The switch-mode power supply 130 uses switches to transfer power between the power source 124 and the load 126. At least one of the switches within the switch-mode power supply 130 can control the flow of current from the power source 124 to the load 126. Parasitic and non-parasitic inductors within the switch-mode power supply 130, however, resist the change in current flow. Consequently, these inductors can cause voltage ringing within the switch-mode power supply 130 in response to the switch opening to interrupt the flow of current.

The switch-mode power supply 130 also includes at least one bootstrap circuit 134, which provides a supply voltage to the switching circuit 132. The bootstrap circuit 134 includes at least one bootstrap switch 136, at least one bootstrap capacitor 138, and at least one bootstrap driver circuit 140.

The bootstrap circuit 134 can harvest ringing energy that is present within the switch-mode power supply 130 using a parasitic body diode of the bootstrap switch 136. The bootstrap switch 136 can have a smaller capacitance and lower impedance compared to an external discrete diode. This facilitates the harvesting of the ringing energy. In particular, the smaller capacitance enables the bootstrap switch 136 to have a faster frequency response to provide rectification.

By harvesting ringing energy, the bootstrap circuit 134 is able to provide a supply voltage that is larger than an input voltage accepted by the switch-mode power supply 130. In this way, the bootstrap circuit 134 enables the switch-mode power supply 130 to provide a target amount of current at lower input voltages compared to other types of switch-mode power supplies. Furthermore, the bootstrap circuit 134 is able to provide this larger supply voltage without using other circuitry, which may increase the cost or footprint of the switch-mode power supply 130.

Although not shown, the power transfer circuit 128 can include other types of control circuitry that controls operation of the switch-mode power supply 130. For example, this control circuitry can monitor operation of the switch-mode power supply 130 and control the pulse-width modulation of the switching circuit 132. The switch-mode power supply 130 is further described with respect to FIG. 2.

FIG. 2 illustrates an example power source 124, an example switch-mode power supply 130, and an example load 126 for harvesting ringing energy. The switch-mode power supply 130 is coupled between the power source 124 and the load 126. In the depicted configuration, the switch-mode power supply 130 is implemented as a buck converter, and includes the switching circuit 132, the bootstrap circuit 134, at least one inductor 202, and at least one capacitor 204.

The switch-mode power supply 130 also includes an input node 206, an output node 208, a ground node 210, a switch node 212, and a bootstrap node 214. The term "node" represents at least a point of electrical connection between two or more components (e.g., circuit elements). Although visually depicted as a single point, the node represents a connected portion of a network that has approximately a same voltage potential between two or more components. In other words, a node can represent at least one of multiple points along a conducting medium (e.g., a wire or trace) that exists between electrically connected components.

The input node 206 couples together the power source 124, the switching circuit 132, and the bootstrap circuit 134. At the input node 206, the switch-mode power supply 130 accepts both an input voltage ($V_{in}$) 216 and an input current ($I_{in}$) 218 from the power source 124. The output node 208 couples together the inductor 202, the capacitor 204, and the load 126. At the output node 208, the switch-mode power supply 130 provides an output voltage ($V_{out}$) 220 and an output current ($I_{out}$) 222 to the load 126.

The ground node 210 couples together the switching circuit 132, the capacitor 204, and a ground 224. At the ground node 210, the switch-mode power supply 130 accepts a ground voltage 226 (e.g., a reference voltage associated with the ground 224). The switch node 212 couples together the switching circuit 132, the bootstrap circuit 134, and the inductor 202. At the switch node 212, the switch-mode power supply 130 provides a voltage ($V_{SW}$) 228. The bootstrap node 214 couples the bootstrap circuit 134 and the switching circuit 132 together. At the bootstrap node 214, the switch-mode power supply 130 provides a voltage ($V_{Boot}$) 230. In particular, the bootstrap circuit 134 provides the voltage ($V_{Boot}$) 230, which is used as a supply voltage for driving at least one switch within the switching circuit 132.

The inductor 202 is coupled between the switch node 212 and the output node 208. In other words, the inductor 202 is coupled to the switching circuit 132, the bootstrap circuit 134, the capacitor 204, and the load 126. Thus, the inductor 202 is coupled between, for instance, the switching circuit 132 and the load 126. The capacitor 204 is coupled between the output node 208 and the ground 224 (e.g., the ground node 210). In other words, the capacitor 204 is coupled to the inductor 202, the load 126, the switching circuit 132 (e.g., via the inductor 202), and the ground 224.

The switching circuit 132 is coupled to the input node 206, the bootstrap node 214, the switch node 212, and the ground node 210. In other words, the switching circuit 132 is coupled to the power source 124, the bootstrap circuit 134, the inductor 202, the capacitor 204, and the ground 224. The bootstrap circuit 134 is coupled to the input node 206, the bootstrap node 214, and the switch node 212. In other words, the bootstrap circuit 134 is coupled to the power source 124, the switching circuit 132, and the inductor 202.

The switching circuit 132 includes multiple switches, which can be implemented using transistors. Example transistors include a metal-oxide-semiconductor field-effect transistor (MOSFET) (e.g., NMOSFET or PMOSFET), a junction field-effect transistor (JFET), a bipolar junction transistor (BJT), an insulated gate bipolar transistor (IGBT), and so forth. Each switch includes an intrinsic capacitor, which prevents the switch from instantaneously switching between a closed state and an open state. In particular, the intrinsic capacitor, such as a gate capacitor associated with a MOSFET, resists a change in voltage at a gate terminal of the switch.

The switch-mode power supply 130 is implemented on a package or printed circuit board (PCB). Parasitic inductances resulting from interconnections (e.g., routing) and layout of the package or printed circuit board are seen by the switching circuit 132. These parasitic inductances are represented by a first parasitic inductor 232-1, which exists between a power node 234 associated with the power source 124 and the input node 206, and a second parasitic inductor 232-2, which exists between the ground node 210 and the ground 224. As an example, inductances of the parasitic inductances 232-1 and 232-2 can each be on the order of 1 or 2 nanohenries (nH).

The parasitic inductors 232-1 and 232-2 and the inductor 202 oppose changes in current. If the current changes through any of the inductors 232-1, 232-2, or 202, an opposing voltage is induced within the affected inductor, which prevents the current from changing instantaneously. The induced voltage is proportional to the rate at which the current changes and the inductance (e.g., self-inductance) of the inductor, as shown by Equation 1 below:

$$V = L\frac{di}{dt} \qquad \text{Equation 1}$$

where V represents the inducted voltage in volts, L represents the inductance of the inductor in henries, and di/dt represents the rate of change of the current in amperes per second. A polarity of the induced voltage opposes the change in the current.

During operation, the switching circuit 132 selectively passes the input current 218 from the input node 206 to the output node 208 (via the switch node 212) or interrupts (e.g., prevents or stops) the flow of the input current 218 from the input node 206 to the output node 208. For example, in a first state, the switching circuit 132 connects the input node 206 to the switch node 212 and disconnects the ground node 210 from the switch node 212. As such, the switching circuit 132 provides the input voltage 216 as the voltage ($V_{SW}$) 228 at the switch node 212 and provides the input current 218 to charge the inductor 202. The input current 218 enables the inductor 202 to increase the amount of energy stored by its magnetic field.

In a second state, the switching circuit 132 disconnects the input node 206 from the switch node 212 and connects the ground node 210 to the switch node 212. This effectively disconnects the power source 124 from the load 126. The switching circuit 132 provides the ground voltage 226 as the voltage ($V_{SW}$) 228 at the switch node 212, and the inductor 202 operates as a current source to provide the output current 222 to the load 126. The output current 222 generated by the inductor 202 discharges the inductor (e.g., decreases the amount of energy stored by the magnetic field).

Due to intrinsic capacitors, the switching circuit 132 is unable to instantaneously transition between the first state and the second state. As such, the switching circuit 132 can be in a third state (e.g., a transition state) while transitioning from the first state to the second state. A duration of time that the switching circuit 132 operates in the third state is referred to as a transition period.

In the third state, the switching circuit 132 decreases the flow of the input current 218 from the input node 206 to the switch node 212 and increases the flow of a current from the ground node 210 to the switch node 212. This causes the parasitic inductor 232-1 to resist the change to the input current 218, the inductor 202 to resist the change to the output current 222, and the parasitic inductor 232-2 to resist the change in current from the ground 224 to the ground node 210. This opposition causes voltage ringing to occur at the input node 206, the output node 208, the ground node 210, and the switch node 212. In some cases, the voltage ringing can have a peak voltage that can be used to increase the amount of energy stored by the bootstrap circuit 134.

Consider the input voltage 216 at the input node 206. While the switching circuit 132 operates in the third state or second state, the voltage ringing caused by the parasitic inductor 232-1 can affect a peak of the input voltage 216, as represented by Equation 2 below:

$$V_{in\_peak} = L\frac{di}{dt} + V_{DC} \qquad \text{Equation 2}$$

wherein $V_{in\_peak}$ represents a peak of the input voltage 216, L represents the inductance of the parasitic inductor 232-1, di represents the change in the input current 218 due to the switching circuit 132 interrupting the flow of the input current 218, dt represents the transition period of the switching circuit 132, and $V_{DC}$ represents a direct current (DC) supply voltage 236 provided by the power source 124 at the power node 234. In some cases, the peak of the input voltage 216 ($V_{in\_peak}$) can be approximately twice the DC supply voltage 236 (or twice an average of the input voltage 216).

In general, the inductance L is a fixed value. In some situations, the input current 218 and the DC supply voltage 236 can vary depending on the type of power source 124 that is connected to the switch-mode power supply 130. As an example, the DC supply voltage 236 can be between approximately 2.5 and 5.5 volts, and the input current 218 can be between approximately 0 and 4 amperes, depending on the output current 222 and the DC supply voltage 236. In some cases, the peak of the input voltage 216 can be between approximately 5 and 11 volts.

The bootstrap circuit 134 can harvest this ringing energy and increase the voltage ($V_{Boot}$) 230 at the bootstrap node 214, compared to a bootstrap recharging method that does not use ring harvesting. This enables the switching circuit 132 to drive a switch using a larger bias voltage and subsequently a lower on resistance, which increases an efficiency of the switch-mode power supply 130. Due to the increased efficiency, the switching circuit 132 can be redesigned to have a smaller die size and still enable the switch-mode power supply 130 to provide a target output current 222. Alternatively, instead of decreasing a size of the switching circuit 132, the switch-mode power supply 130 can selectively provide larger target output currents 222, which may be advantageous for particular types of loads 126. Harvesting the ringing energy also enables the switch-mode power supply 130 to provide a target output current 222 for lower input voltages 216 compared to other similarly sized switch-mode power supplies that do not harvest ringing energy. The switching circuit 132 is further described with respect to FIG. 3.

Figure 3:
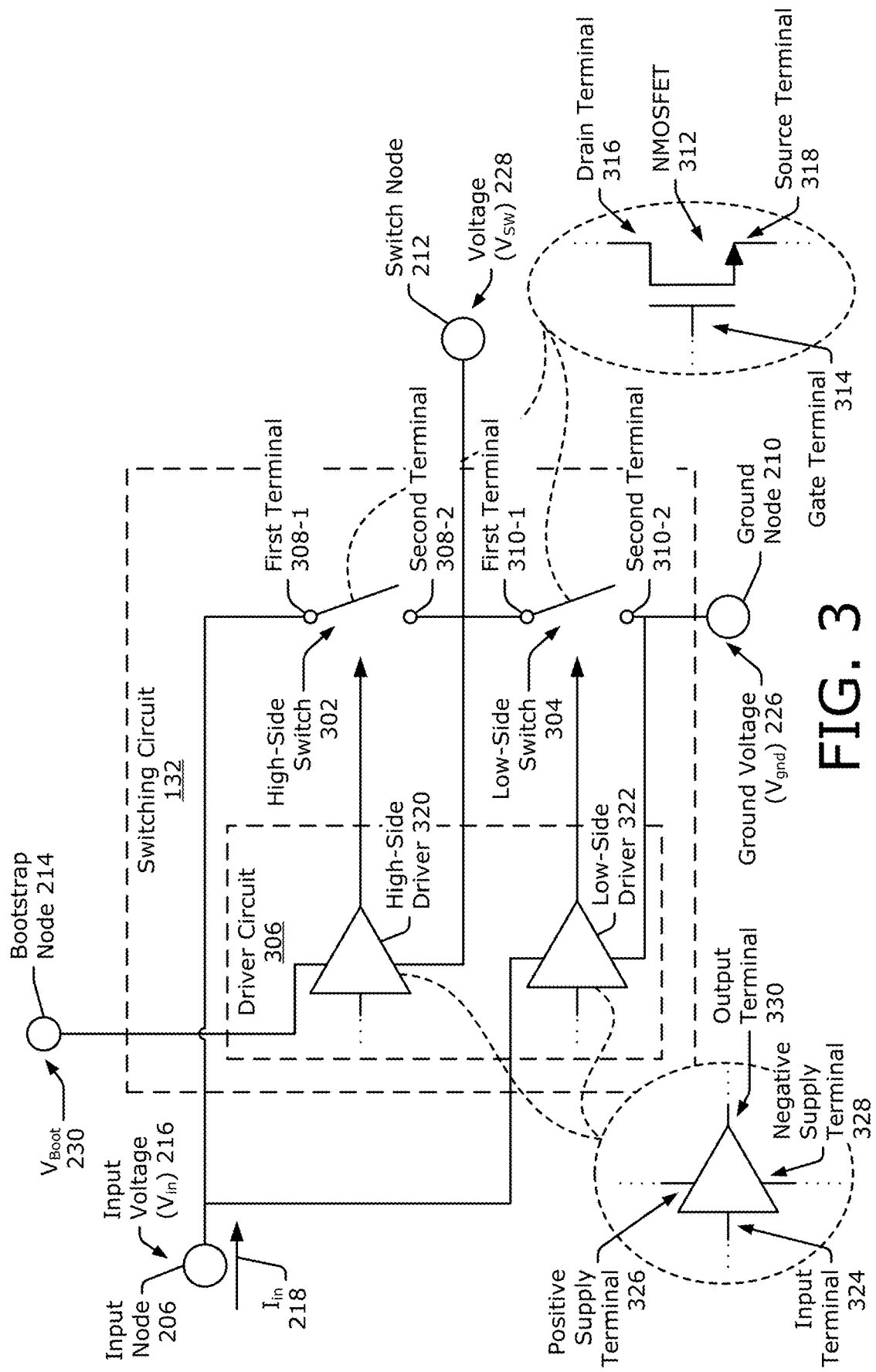
FIG. 3 illustrates an example switching circuit of a switch-mode power supply for harvesting ringing energy.

FIG. 3 illustrates an example switching circuit 132 for harvesting ringing energy. The switching circuit 132 includes a high-side switch 302, a low-side switch 304, and a driver circuit 306. The high-side switch 302 has a first terminal 308-1 coupled to the input node 206 and a second terminal 308-2 coupled to the switch node 212. The low-side switch 304 has a first terminal 310-1 coupled to the switch node 212 (e.g., coupled to the second terminal 308-2 of the high-side switch 302) and a second terminal 310-2 coupled to the ground node 210.

The high-side switch 302 and the low-side switch 304 can selectively be in a closed state or an open state. In general, the high-side switch 302 and the low-side switch 304 are in opposite states. For example, the high-side switch 302 can be in the closed state, and the low-side switch 304 can be in the open state. Alternatively, the high-side switch 302 can be in the open state, and the low-side switch 304 can be in the closed state.

The high-side switch 302 and the low-side switch 304 can be implemented using any type of transistor. As an example, the high-side switch 302 and the low-side switch 304 can each be implemented using an NMOSFET 312. The NMOSFET 312 has a gate terminal 314, a drain terminal 316, and a source terminal 318. The drain terminal 316 corresponds to a first terminal of the corresponding switch (e.g., the first terminal 308-1 of the high-side switch 302 or the first terminal 310-1 of the low-side switch 304). The source terminal 318 corresponds to a second terminal of the corresponding switch (e.g., the second terminal 308-2 of the high-side switch 302 or the second terminal 310-2 of the low-side switch 304). The gate terminal 314 corresponds to a third terminal (not shown) that is coupled to the driver circuit 306. The techniques for harvesting ringing energy are particularly advantageous for implementations in which the high-side switch 302 is implemented using a transistor that is to be driven with a voltage that is greater than the input voltage ($V_{in}$) 216 at the first terminal 308-1 to improve efficiency. This includes implementations in which the high-side switch 302 is implemented using the NMOSFET 312.

In general, biasing the gate terminal 314 of the high-side switch 302 with a larger voltage increases an efficiency of the switching circuit 132. For example, increasing the voltage ($V_{Boot}$) 230 can increase the gate-to-source voltage across the high-side switch 302. This in turn reduces the internal resistance of the high-side switch 302, which reduces conductive losses. By reducing the conductive losses, an efficiency of the high-side switch 302 improves. An amount of self-heating is also reduced by reducing the conductive losses. Therefore, driving the high-side switch 302 with a larger voltage increases an efficiency of the switch-mode power supply 130.

The driver circuit 306 is coupled to the input node 206, the bootstrap node 214, the high-side switch 302, the low-side switch 304, the switch node 212, and the ground node 210. In other words, the driver circuit 306 is coupled to the power source 124 (of FIG. 2), the bootstrap circuit 134 (of FIG. 2), the high-side switch 302, the low-side switch 304, the inductor 202 (of FIG. 2), and the ground 224 (of FIG. 2).

The driver circuit 306 provides respective bias voltages and driver currents to cause the switches 302 and 304 to be in a specified state (e.g., the closed state or the open state). The driver currents assist with charging or discharging intrinsic capacitors within the switches 302 and 304. The rate at which the switches 302 and 304 transition between states is dependent upon the rate at which the respective intrinsic capacitors are charged or discharged by the respective driver currents. In general, increasing the driver current increases the transition rate (e.g., decreases the transition period of the associated switch), and decreasing the driver current decreases the transition rate (e.g., increases the transition period of the associated switch).

The driver circuit 306 includes a high-side driver 320 and a low-side driver 322. Each of the drivers 320 and 322 includes an input terminal 324, a positive supply terminal 326, a negative supply terminal 328, and an output terminal 330. The positive supply terminal 326 of the high-side driver 320 is coupled to the bootstrap node 214 (e.g., coupled to the bootstrap circuit 134), and the negative supply terminal 328 of the high-side driver 320 is coupled to the switch node 212 (e.g., coupled to the second terminal 308-2 of the high-side switch 302 and the first terminal 310-1 of the low-side switch 304). The output terminal 330 of the high-side driver 320 is coupled to the third terminal of the high-side switch 302 (e.g., the gate terminal 314 of the high-side switch 302).

The positive supply terminal 326 of the low-side driver 322 is coupled to the input node 206 (e.g., coupled to the first terminal 308-1 of the high-side switch 302), and the negative supply terminal 328 of the low-side driver 322 is coupled to the ground node 210 (e.g., coupled to the second terminal 310-2 of the low-side switch 304). The output terminal 330 of the low-side driver 322 is coupled to the third terminal of the low-side switch 304 (e.g., the gate terminal 314 of the low-side switch 304).

The input terminals 324 of the drivers 320 and 322 can be coupled to a driver controller (not shown). The driver controller controls the states of the switches 302 and 304. As an example, the driver controller can be implemented as an asynchronous finite state machine (AFSM).

In some implementations, the switching circuit 132 is implemented within an integrated circuit. In the depicted configuration, the switching circuit 132 is integrated within the switch-mode power supply 130. In other implementations, the switching circuit 132 (or a portion of the switching circuit 132 such as the driver controller) can be external to the switch-mode power supply 130. For example, the driver controller can be implemented by the PMIC, the application processor 108, a main processor, a secondary processor, or a low-power digital signal processor (DSP) of the computing device 102.

During operation, the switching circuit 132 alternates between the first state and the second state, as described above with respect to FIG. 2. In the first state, the high-side switch 302 is in the closed state, and the low-side switch 304 is in the open state. This enables the switching circuit 132 to charge the inductor 202 (of FIG. 2) and provide the input voltage 216 as the voltage ($V_{SW}$) 228 at the switch node 212.

In the second state, the high-side switch 302 is in the open state and the low-side switch 304 is in the closed state. This causes the switching circuit 132 to provide the ground voltage 226 (of FIG. 2) as the voltage ($V_{SW}$) 228 at the switch node 212, and enables the inductor 202 to discharge.

To enable operation of the first state, the bootstrap circuit 134 provides the voltage ($V_{Boot}$) 230 to the switching circuit 132. The voltage ($V_{Boot}$) 230 is a supply voltage used to drive the high-side switch 302. In particular, the high-side driver 320 uses the voltage ($V_{Boot}$) 230 to configure the high-side switch 302 in the closed state. The bootstrap circuit 134 is further described with respect to FIG. 4.

Figure 4:
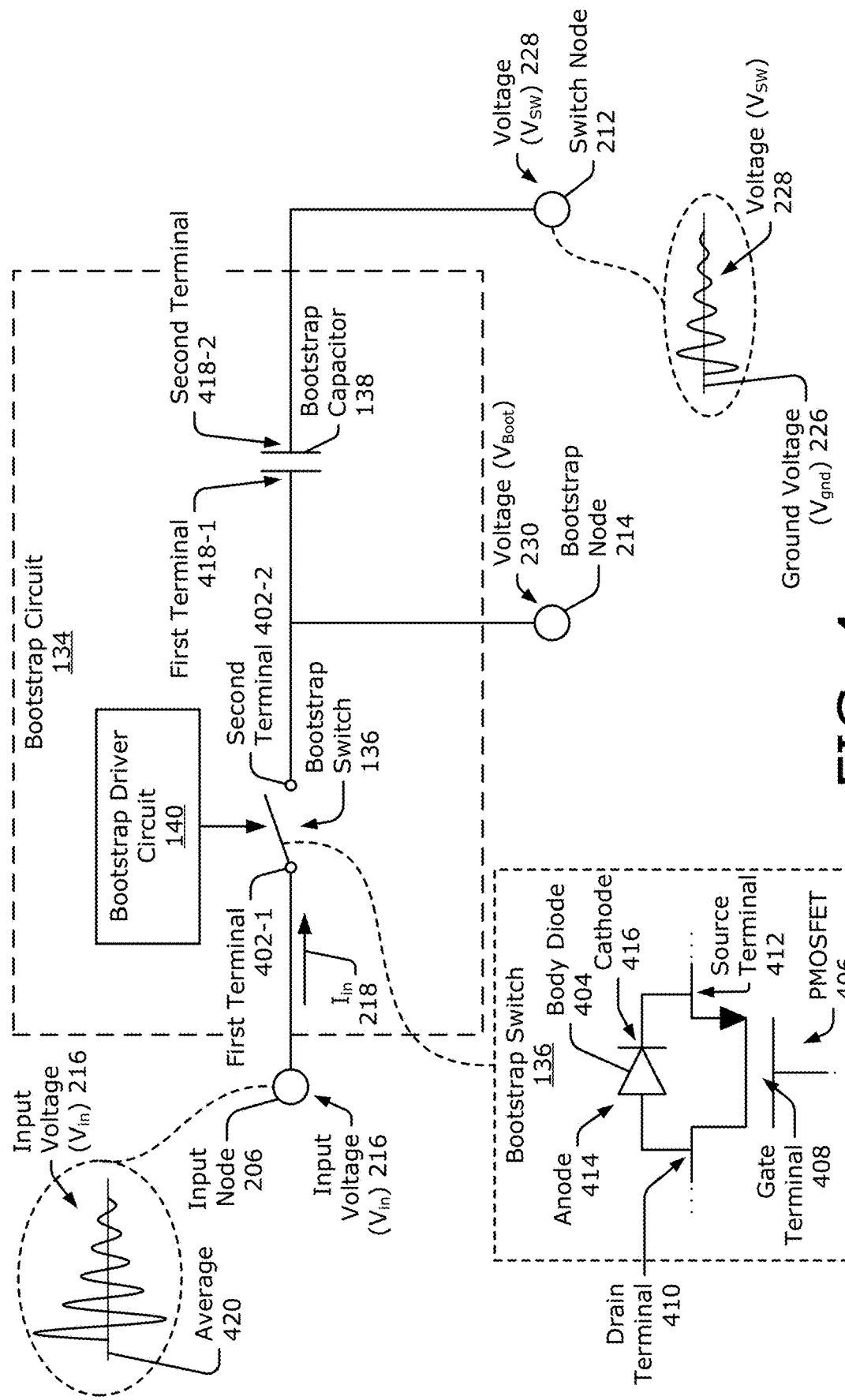
FIG. 4 illustrates an example bootstrap circuit of a switch-mode power supply for harvesting ringing energy.

FIG. 4 illustrates an example bootstrap circuit 134 for harvesting ringing energy. In the depicted configuration, the bootstrap circuit 134 includes the bootstrap switch 136, the bootstrap capacitor 138, and the bootstrap driver circuit 140. In an example implementation, the switch-mode power supply 130 of FIG. 2 includes an integrated circuit (IC) that implements at least a portion of the switching circuit 132 (e.g., the high-side switch 302 and the low-side switch 304) and at least a portion of the bootstrap circuit 134 (e.g., the bootstrap switch 136). In this case, the inductor 202 (of FIG. 2), the capacitor 204 (of FIG. 2), and the bootstrap capacitor 138 can be implemented on a PCB. In this manner, these components can be external to the integrated circuit.

The bootstrap switch 136 has a first terminal 402-1 and a second terminal 402-2. The first terminal 402-1 is coupled to the input node 206 (e.g., coupled to the power source 124 of FIG. 2, the positive supply terminal 326 of the low-side driver 322 of FIG. 3, and the first terminal 308-1 of the high-side switch 302 of FIG. 3). The second terminal 402-2 is coupled to the bootstrap node 214 (e.g., coupled to the positive supply terminal 326 of the high-side driver 320 of FIG. 3 and the bootstrap capacitor 138). The bootstrap switch 136 can selectively be in the closed state or the open state.

The bootstrap switch 136 includes a transistor with a body diode 404 (e.g., an internal diode or a parasitic diode). If the bootstrap switch 136 is in the closed state, the body diode 404 is shorted (e.g., bypassed) by a channel (e.g., a conducting channel) that is induced between the first and second terminals 402-1 and 402-2. However, if the bootstrap switch 136 is in the open state, a channel is not induced. Consequently, the body diode 404 can allow current to flow from the first terminal 402-1 to the second terminal 402-2.

In this example, the bootstrap switch 136 includes a PMOSFET 406. The PMOSFET 406 includes a gate terminal 408, a drain terminal 410, and a source terminal 412. The drain terminal 410 represents the first terminal 402-1 of the bootstrap switch 136, and the source terminal 412 represents the second terminal 402-2 of the bootstrap switch 136. The gate terminal 408 represents a third terminal (not explicitly shown) of the bootstrap switch 136, which is coupled to the bootstrap driver circuit 140. The body diode 404 of the bootstrap switch 136 has an anode 414 coupled to the drain terminal 410 and a cathode 416 coupled to the source terminal 412.

The bootstrap capacitor 138 has a first terminal 418-1 and a second terminal 418-2. The first terminal 418-1 is coupled to the bootstrap node 214 (e.g., coupled to the second terminal 402-2 of the bootstrap switch 136 and the positive supply terminal 326 of the high-side driver 320 of FIG. 3). The second terminal 418-2 is coupled to the switch node 212 (e.g., coupled to the second terminal 308-2 of the high-side switch 302 of FIG. 3, the first terminal 310-1 of the low-side switch 304 of FIG. 3, and the inductor 202 of FIG. 2). The bootstrap capacitor 138 stores energy for providing the voltage ($V_{Boot}$) 230 to the switching circuit 132 (of FIG. 3).

During operation, the bootstrap switch 136 can selectively operate in a closed state or an open state. In the closed state, the bootstrap switch 136 can charge the bootstrap capacitor 138 through an induced channel while the switching circuit 132 is in the second state (e.g., while the high-side switch 302 is in the open state and the low-side switch 304 is in the closed state). Assuming the bootstrap switch 136 is implemented using the PMOSFET 406, the PMOSFET 406 can be biased according to the triode region to cause the bootstrap switch 136 to be in the closed state. This enables the input current ($I_{in}$) 218 to flow through the bootstrap switch 136 and charge the bootstrap capacitor 138 such that the input voltage 216 is provided as the voltage ($V_{Boot}$) 230 at the bootstrap node 214. This mode of operation is further described with respect to FIG. 5-1.

In the open state, the bootstrap switch 136 can charge the bootstrap capacitor 138 through the body diode 404 while the switching circuit 132 is in the second state or transitioning from the first state to the second state. Assuming the bootstrap switch 136 is implemented using the PMOSFET 406, the PMOSFET 406 can be biased according to the cut-off region to cause the bootstrap switch 136 to be in the open state. As an example, the bootstrap driver circuit 140 can connect the gate terminal 408 of the bootstrap switch 136 to the source terminal 412 to cause the PMOSFET 406 to be biased in the cut-off region. Alternatively, the bootstrap driver circuit 140 can provide a voltage at the gate terminal 408 that is greater than or equal to the voltage at the source terminal 412.

By being in the open state, the bootstrap switch 136 disconnects the input node 206 from the bootstrap node 214. However, the parasitic body diode 404 enables the input current ($I_{in}$) 218 to flow from the input node 206 to the bootstrap node 214 if the body diode 404 is forward biased by the input voltage 216 and the voltage ($V_{Boot}$) 230 at the bootstrap node 214.

Voltage ringing can occur at the input node 206 and the switch node 212. The voltage ringing can occur in response to the high-side switch 302 of FIG. 3 transitioning from the closed state to the open state and interrupting the flow of the input current 218 from the input node 206 to the switch node 212. The voltage ringing causes the input voltage 216 at the input node 206 to oscillate around an average 420 of the input voltage 216 (e.g., the DC supply voltage 236 of FIG. 2). The voltage ringing also causes the voltage ($V_{SW}$) 228 at the switch node 212 to oscillate. The oscillation results in the input voltage 216 having peaks above the average 420 and the voltage ($V_{SW}$) at the switch node 212 having peaks above the ground voltage 226. In some situations, a peak-to-peak voltage of the input voltage 216 is larger than the peak-to-peak voltage of the voltage ($V_{sw}$) 228 at the switch node 212. This can be due, in part, to the switching circuit 132 (of FIG. 3) connecting the switch node 212 to the ground 224 while in or transitioning to the second state. The oscillation of the input voltage 216 is also approximately 180 degrees out-of-phase with respect to the oscillation of the voltage ($V_{SW}$) 228 at the switch node 212.

If the bootstrap switch 136 is in the closed state while the voltage ringing occurs, the energy from the voltage ringing passes in and out of the bootstrap capacitor 138 due to the bidirectional flow of current through the induced channel of the bootstrap switch 136. However, by operating the bootstrap switch 136 in the open state, the body diode 404 enables the bootstrap switch 136 to operate as a rectifier and charge the bootstrap capacitor 138 during the positive half-cycles that occur in the ringing input voltage 216. This charging can continue until the ringing of the input voltage 216 is significantly dampened or the bootstrap capacitor 138 is fully charged. During the negative half-cycles that occur in the ringing input voltage 216, the body diode 404 is reversed biased and does not conduct current. By limiting the flow of current to a single direction, the body diode 404 enables the bootstrap capacitor 138 to harvest the ringing energy. This mode of operation is further described with respect to FIG. 5-2.

In an example situation, the voltage ringing causes the input voltage 216 to have a peak that is approximately twice the average 420 of the input voltage 216. By charging the bootstrap capacitor 138 with this ringing energy, the bootstrap circuit 134 can provide a voltage ($V_{Boot}$) 230 that is larger than the average 420 of the input voltage 216 (e.g., larger than the DC supply voltage 236). For example, the voltage ($V_{Boot}$) 230 can be at least 1.5 times larger than the average of the input voltage or at least 1.8 times larger than the average of the input voltage. In some situations, the voltage ($V_{Boot}$) 230 (or an average of the voltage 230) can be approximately equal to twice the average 420 of the input voltage 216 (e.g., within 10% of twice the average 420 of the input voltage 216). The different modes of operation of the bootstrap circuit 134 are further described with respect to FIGS. 5-1 and 5-2.

FIG. 5-1 illustrates an example state diagram 500-1 of the high-side switch 302, the low-side switch 304, and the bootstrap switch 136 for a normal mode 502 of operation. During operation, the high-side switch 302 and the low-side switch 304 cycle between a closed state 504 and an open state 506. In general, the low-side switch 304 is in an opposite state as the high-side switch 302. For example, if the high-side switch 302 is in the closed state 504, the low-side switch 304 is in the open state 506. Alternatively, if the high-side switch 302 is in the open state 506, the low-side switch 304 is in the closed state 504. Voltage ringing can occur, for instance, responsive to the high-side switch 302 transitioning from the closed state 504 to the open state 506.

According to the normal mode 502, the bootstrap switch 136 is in an opposite state as the high-side switch 302 (e.g., is in a same state as the low-side switch 304). For example, the bootstrap switch 136 is in the open state 506 responsive to the high-side switch 302 being in the closed state 504. Additionally, the bootstrap switch 136 is in the closed state 504 responsive to the high-side switch 302 being in the open state 506. In this manner, the bootstrap switch 136 operates as a switch during the normal mode 502. While in the closed state 504, the bootstrap switch 136 charges the bootstrap capacitor 138 to provide the input voltage 216 as the voltage ($V_{Boot}$) 230.

In some situations, however, the input voltage 216 may be at a level that is insufficient for driving the high-side switch 302 or that reduces an efficiency of the switch-mode power supply 130. To address this, the bootstrap circuit 134 can operate according to another mode, which enables the bootstrap circuit 134 to provide a voltage ($V_{Boot}$) 230 that is greater than an average 420 of the input voltage 216, as further described with respect to FIG. 5-2.

FIG. 5-2 illustrates an example state diagram 500-2 of the high-side switch 302, the low-side switch 304, and the bootstrap switch 136 for a harvest mode 508 of operation. As shown in the state diagram 500-2, the high-side switch 302 and the low-side switch 304 have similar operations as described above with respect to the state diagram 500-1 of FIG. 5-1. The bootstrap switch 136, however, operates in a different manner in the state diagram 500-2 compared to the state diagram 500-1 in order to harvest ringing energy.

According to the harvest mode 508, the bootstrap switch 136 is in the open state 506 while the high-side switch 302 is in the open state 506. While in the open state 506, the bootstrap switch 136 operates as a rectifier to charge the bootstrap capacitor 138 using the ringing energy of the input voltage 216. In this way, the bootstrap circuit 134 provides a voltage ($V_{Boot}$) 230 that is greater than an average 420 of the input voltage 216.

In some implementations, harvesting the ringing energy can cause the voltage ($V_{Boot}$) 230 to exceed a safe operating area (SOA) of the high-side driver 320 (of FIG. 3) and the high-side switch 302 (of FIG. 3), particularly in situations in which the input voltage 216 is large. Consider an example in which the high-side driver 320 is designed to operate with a supply voltage that is 6 volts or less. If the input voltage 216 is approximately 5.5 volts, the bootstrap circuit 134 can potentially provide a voltage ($V_{Boot}$) 230 of 11 volts by harvesting the ringing energy. In this situation, the voltage ($V_{Boot}$) 230 can be larger than the 6 volts the high-side driver 320 is designed to handle. As a result, the high-side driver 320 may be damaged by the ringing energy harvested by the bootstrap circuit 134.

To provide protection for the switching circuit 132, the bootstrap circuit 134 can include a clamp (not shown) across the bootstrap capacitor 138. The clamp can limit the voltage ($V_{Boot}$) 230 at the bootstrap node 214. Alternatively, the bootstrap driver circuit 140 can monitor the input voltage 216 and dynamically enable or disable the harvest mode 508, as further described with respect to FIG. 6.

Figure 6:
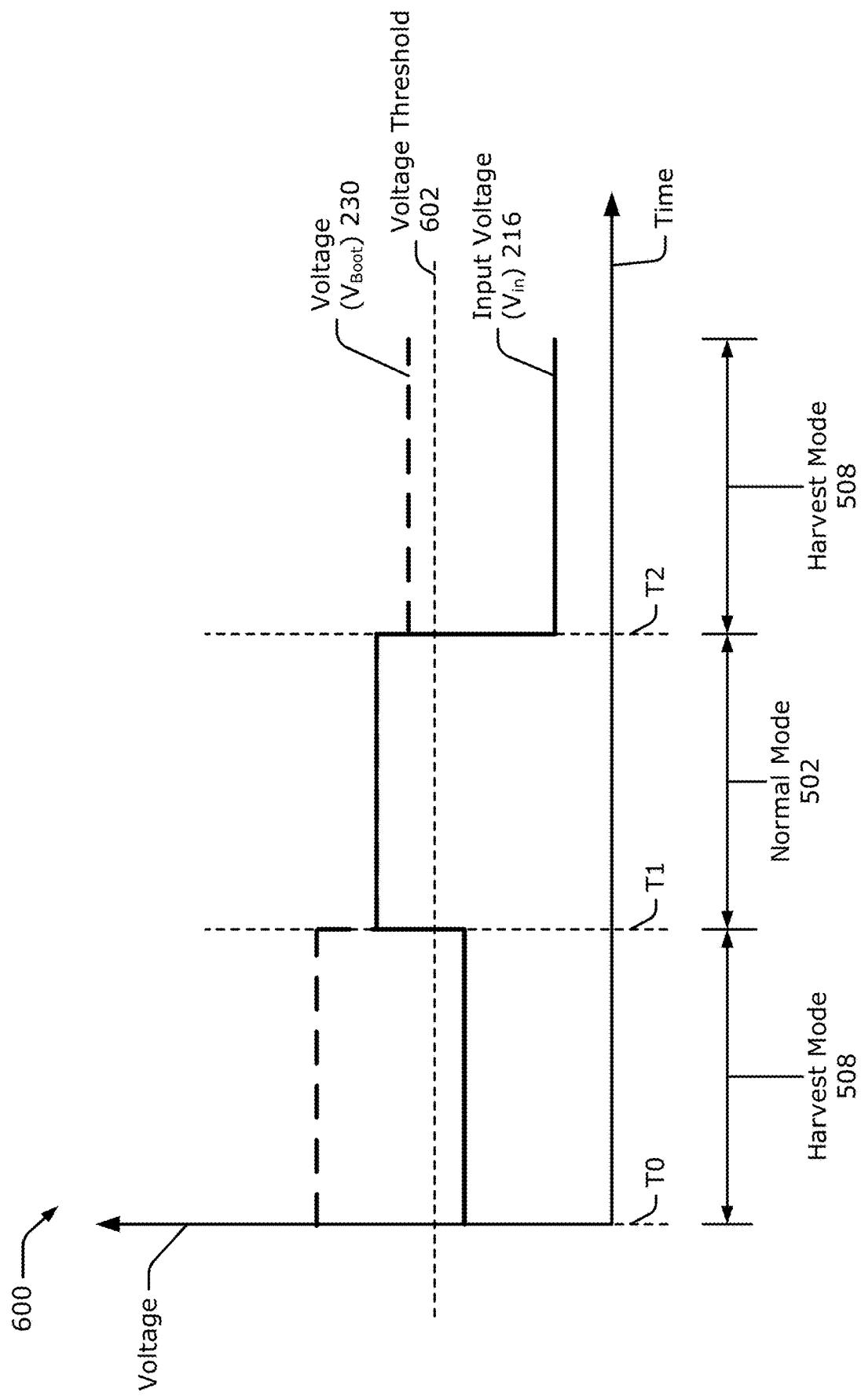
FIG. 6 illustrates an example voltage-timing diagram for harvesting ringing energy.

FIG. 6 illustrates an example voltage-timing diagram 600 for harvesting ringing energy. The voltage-timing diagram 600 depicts example values of the input voltage 216 and the voltage ($V_{Boot}$) 230 at the bootstrap node 214. For simplicity, average values of the input voltage 216 and the voltage ($V_{Boot}$) 230 are shown. As such, the voltage-timing diagram 600 does not depict voltage fluctuations that are caused by the switching circuit 132 transitioning between states and caused by the charging or discharging of the bootstrap capacitor 138 and the inductor 202.

The bootstrap driver circuit 140 can monitor the input voltage 216 and compare the input voltage 216 to a voltage threshold 602. The voltage threshold 602 can be based on the safe operating area of the switching circuit 132. For example, the voltage threshold 602 can be half a maximum allowable supply voltage for the high-side driver 320. If the maximum allowable supply voltage for the high-side driver 320 is 6 volts, the voltage threshold 602 can be approximately 3 volts or less. In general, the voltage threshold 602 is chosen to protect the switching circuit 132 by preventing the bootstrap circuit 134 from operating according to the harvest mode 508 if the voltage ($V_{Boot}$) 230 is likely to exceed a voltage limit associated with the switching circuit 132.

At time T0, the input voltage 216 is less than the voltage threshold 602. As such, the bootstrap driver circuit 140 causes the bootstrap switch 136 to operate according to the harvest mode 508 (e.g., be in the open state 506 depicted in FIG. 5-2). By harvesting the ringing energy, the voltage ($V_{Boot}$) 230 can be approximately twice the input voltage 216. Assuming that the input voltage is approximately 2.5 volts, the voltage ($V_{Boot}$) 230 can be between approximately 4.6 and 5.4 volts (e.g., an average of the voltage ($V_{Boot}$) 230 can be approximately 5 volts).

At time T1, the input voltage 216 increases and is greater than the voltage threshold 602. In this case, the bootstrap driver circuit 140 detects the change in the input voltage 216 and causes the bootstrap switch 136 to operate according to the normal mode 502 (e.g., be in an opposite state as the high-side switch 302 as shown in FIG. 5-1). By operating according to the normal mode 502, the voltage ($V_{Boot}$) 230 can be approximately equal to the input voltage 216. Assuming that the input voltage is approximately 4 volts, the voltage ($V_{Boot}$) 230 can be between approximately 3.8 and 4 volts.

At time T2, the input voltage 216 decreases and is less than the voltage threshold 602. For some switch-mode power supplies, the input voltage 216 may be insufficient for driving the high-side switch 302 and providing a target output current 222 (of FIG. 2). However, the bootstrap driver circuit 140 detects the change in the input voltage 216 and causes the bootstrap switch 136 to operate according to the harvest mode 508. In this way, the bootstrap circuit 134 can provide a voltage ($V_{Boot}$) 230 that is greater than the input voltage 216 and sufficient for driving the high-side switch 302. By harvesting the ringing energy, the bootstrap circuit 134 enables the switch-mode power supply 130 to provide the target output current 222, even if the input voltage 216 is insufficient by itself. An example bootstrap driver circuit 140 is further described with respect to FIG. 7.

Figure 7:
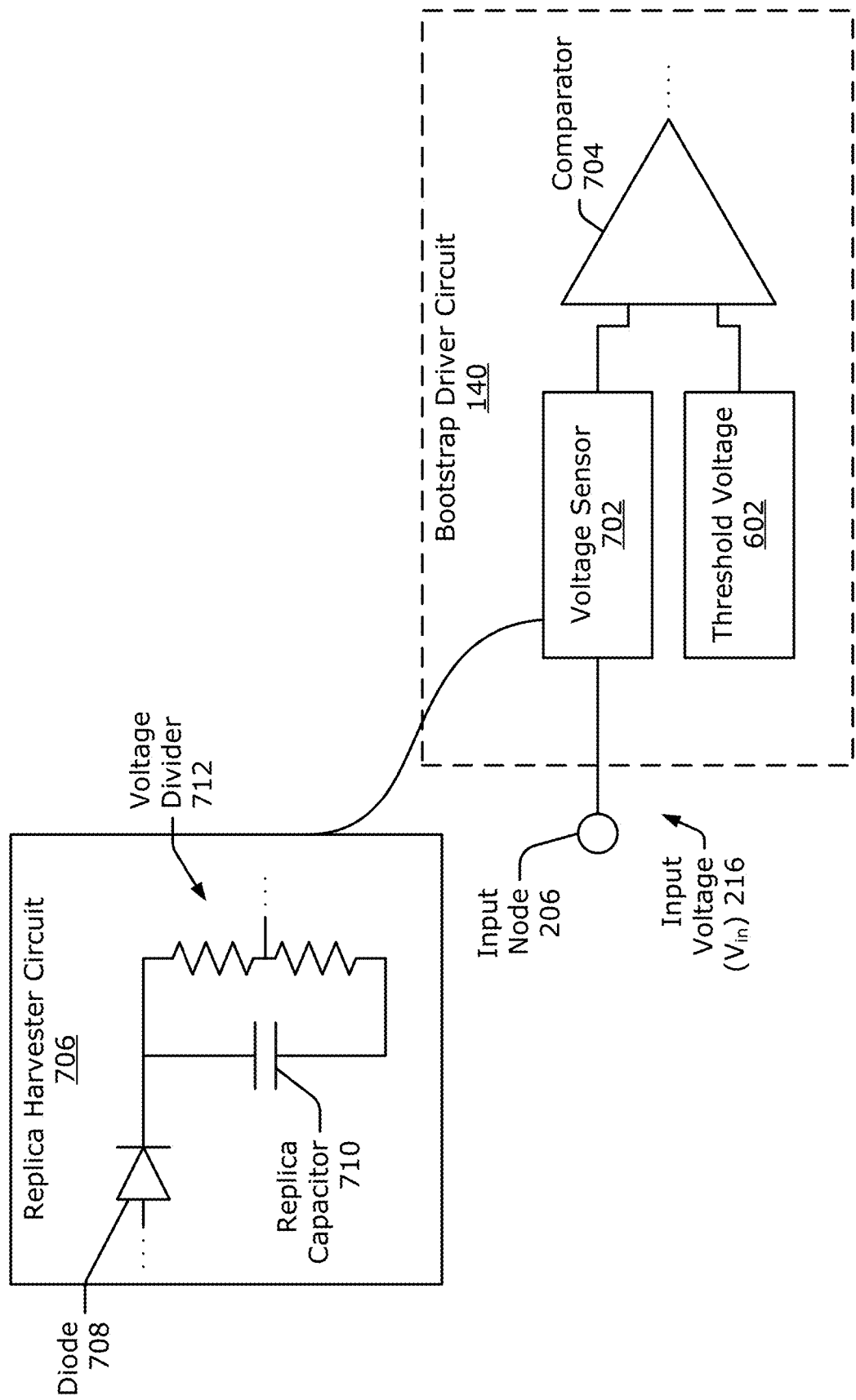
FIG. 7 illustrates an example bootstrap driver circuit of a bootstrap circuit for harvesting ringing energy.

FIG. 7 illustrates an example bootstrap driver circuit 140 for harvesting ringing energy. The bootstrap driver circuit 140 includes a voltage sensor 702 and a comparator 704. The voltage sensor 702 is coupled to the input node 206 (e.g., to the first terminal 402-1 of the bootstrap switch 136 of FIG. 4). The voltage sensor 702 monitors the input voltage 216 (e.g., monitors an average 420 of the input voltage 216 or instantaneous values of the input voltage 216).

Inputs of the comparator 704 are coupled to the voltage sensor 702 and the voltage threshold 602. As an example, the power transfer circuit 128 (of FIG. 1) can generate the voltage threshold 602. An output of the comparator 704 can be coupled to other components of the bootstrap driver circuit 140, such as a voltage generator.

The comparator 704 compares a value of the input voltage 216 (as provided by the voltage sensor 702) to the voltage threshold 602 and appropriately controls the biasing of the bootstrap switch 136 to provide protection for the switching circuit 132. In particular, the output of the comparator 704 controls a bias voltage that is applied to the gate terminal 408 of the bootstrap switch 136 to cause the bootstrap switch 136 to operate according to the normal mode 502 or the harvest mode 508. A speed of the comparator 704 can be customized based on a known speed at which the input voltage 216 can transition to a value that is above the voltage threshold 602. As an example, the speed of the comparator 704 can be one the order of a microsecond.

In some implementations, the voltage sensor 702 is implemented using a replica harvester circuit 706. The replica harvester circuit 706 includes a diode 708, a replica capacitor 710, and a voltage divider 712. An anode of the diode 708 is coupled to the input node 206 and a cathode of the diode 708 is coupled to the replica capacitor 710 and the voltage divider 712. The replica capacitor 710 and the voltage divider 712 are implemented in parallel. The voltage divider provides a measured voltage to the comparator 704.

Using the replica harvester circuit 706, the bootstrap driver circuit 140 can directly sense the ringing of the input voltage 216 and enable the harvest mode 508 to activate more often to increase efficiency of the switch-mode power supply 130. As an example, the replica harvester circuit 706 can enable the bootstrap driver circuit 140 to operate the bootstrap circuit 134 in the harvest mode 508 if the input voltage 216 is 3.5 volts, or even higher (e.g., 4.5 volts) if a load current is sufficiently small. Without the replica harvester circuit 706, the bootstrap driver circuit 140 may be limited to operating the bootstrap circuit 134 in the harvest mode 508 if the input voltage is 3 volts or less.

FIG. 8 is a flow diagram illustrating an example process 800 for harvesting ringing energy. The process 800 is described in the form of a set of blocks 802-808 that specify operations that can be performed. However, operations are not necessarily limited to the order shown in FIG. 8 or described herein, for the operations may be implemented in alternative orders or in fully or partially overlapping manners. Also, more, fewer, and/or different operations may be implemented to perform the process 800, or an alternative process. Operations represented by the illustrated blocks of the process 800 may be performed by a switch-mode power supply 130 (e.g., of FIG. 1 or 2). More specifically, the operations of the process 800 may be performed by a bootstrap circuit 134 as shown in FIG. 2 or 4.

At block 802, an input voltage is accepted at a first terminal of a bootstrap switch of a bootstrap circuit. For example, the bootstrap switch 136 of the bootstrap circuit 134 accepts the input voltage 216 at the first terminal 402-1, as shown in FIG. 4. The bootstrap switch 136 can be implemented as the PMOSFET 406 of FIG. 4 and can accept the input voltage 216 at the drain terminal 410.

At block 804, the bootstrap switch is in an open state. For example, the bootstrap driver circuit 140 causes the bootstrap switch 136 to be in the open state 506. In particular, the bootstrap driver circuit 140 can bias the bootstrap switch 136 according to the cut-off region. To bias the bootstrap switch 136 in this manner, the bootstrap driver circuit 140 can provide a bias voltage at the gate terminal 408 of the bootstrap switch that is greater than or equal to a voltage at the source terminal 412 or connect the gate terminal 408 to the source terminal 412.

At block 806, a bootstrap capacitor of the bootstrap circuit is charged using a body diode of the bootstrap switch and based on the bootstrap switch being in the open state. The body diode comprises an anode coupled to the first terminal and a cathode coupled to a second terminal of the bootstrap switch. The bootstrap capacitor is coupled to the second terminal of the bootstrap switch.

For example, the bootstrap switch 136 charges, based on the bootstrap switch 136 being in the open state 506, the bootstrap capacitor 138 using the body diode 404. The body diode 404 has an anode 414 coupled to the first terminal 402-1 (e.g., the drain terminal 410) and a cathode 416 coupled to a second terminal 402-2 (e.g., the source terminal 412) of the bootstrap switch 136. The bootstrap capacitor 138 is coupled to the second terminal 402-2 of the bootstrap switch 136, as shown in FIG. 4.

At block 808, a voltage at the second terminal of the bootstrap switch is provided based on the charging. The voltage is greater than an average of the input voltage. For example, the bootstrap circuit 134 provides the voltage ($V_{Boot}$) 230 at the second terminal 402-2 of the bootstrap switch 136 (e.g., at the bootstrap node 214). By harvesting the ringing energy, the voltage ($V_{Boot}$) 230 is greater than an average 420 of the input voltage 216. For example, the voltage ($V_{Boot}$) 230 can be at least 1.5 times larger, 1.8 times larger, or 2 times larger than the average 420 of the input voltage 216. This enables the switch-mode power supply 130 to operate with higher efficiencies and provide a target output current 222 for smaller input voltages 216 compared to other switch-mode power supplies.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

Some aspects are described below.

Aspect 1: An apparatus comprising:
a bootstrap circuit comprising:
a bootstrap capacitor; and
a bootstrap switch comprising:
  a first terminal configured to accept an input voltage;
  a second terminal coupled to the bootstrap capacitor; and
  a body diode comprising an anode coupled to the first terminal and a cathode coupled to the second terminal,
the bootstrap switch configured to:
  be in an open state to charge the bootstrap capacitor via the body diode; and
  provide a voltage at the second terminal of the bootstrap switch, the voltage greater than an average of the input voltage.

Aspect 2: The apparatus of aspect 1, wherein the bootstrap switch is configured to charge the bootstrap capacitor via the body diode based on voltage ringing being present in the input voltage, the voltage ringing causing peaks of the input voltage to be greater than the average of the input voltage.

Aspect 3: The apparatus of aspect 1 or 2, wherein the voltage at the second terminal is at least 1.5 times larger than the average of the input voltage.

Aspect 4: The apparatus of aspect 3, wherein the voltage at the second terminal is at least 1.8 times larger than the average of the input voltage.

Aspect 5: The apparatus of any preceding aspect, wherein an average of the voltage at the second terminal is approximately two times larger than the average of the input voltage.

Aspect 6: The apparatus of any preceding aspect, wherein the bootstrap switch is further configured to selectively:
be in a closed state to charge the bootstrap capacitor via an induced channel; or
be in the open state to charge the bootstrap capacitor via the body diode.

Aspect 7: The apparatus of aspect 6, wherein the bootstrap switch is configured to selectively:
cause the voltage at the second terminal to be at a first level responsive to being in the closed state to charge the bootstrap capacitor via the induced channel; or
cause the voltage at the second terminal to be at a second level responsive to being in the open state to charge the bootstrap capacitor via the body diode, the second level greater than the first level.

Aspect 8: The apparatus of aspect 7, wherein:
the first level is approximately equal to the average of the input voltage; and
the second level is approximately equal to twice the average of the input voltage.

Aspect 9: The apparatus of any one of aspects 6-8, wherein the bootstrap circuit comprises a bootstrap driver circuit configured to:
monitor the input voltage; and
responsive to the input voltage being greater than a voltage threshold, cause the bootstrap switch to be in the closed state to charge the bootstrap capacitor via the induced channel; or
responsive to the input voltage being less than the voltage threshold, cause the bootstrap switch to be in the open state to charge the bootstrap capacitor via the body diode.

Aspect 10: The apparatus of any preceding aspect, wherein:
the bootstrap switch comprises a p-channel metal-oxide-semiconductor field-effect transistor comprising:
  a drain terminal as the first terminal;
  a source terminal as the second terminal; and
  a gate terminal; and
the bootstrap switch is configured to operate in the open state responsive to the p-channel metal-oxide-semiconductor field-effect transistor being biased according to a cut-off region.

Aspect 11: The apparatus of aspect 10, wherein the bootstrap circuit comprises a bootstrap driver circuit configured to:
provide a gate voltage at the gate terminal of the p-channel metal-oxide-semiconductor field-effect transistor; and
cause the gate voltage to be greater than or equal to a voltage at the source terminal of the p-channel metal-oxide-semiconductor field-effect transistor to bias the p-channel metal-oxide-semiconductor field-effect transistor according to the cut-off region.

Aspect 12: The apparatus of aspect 11, wherein the bootstrap driver circuit is configured to connect the gate terminal of the p-channel metal-oxide-semiconductor field-effect transistor to the source terminal of the p-channel metal-oxide-semiconductor field-effect transistor to cause the gate voltage to be approximately equal to the voltage at the source terminal.

Aspect 13: The apparatus of any preceding aspect, wherein:
the bootstrap capacitor comprises:
  a first terminal coupled to the second terminal of the bootstrap switch; and
  a second terminal; and
the apparatus comprises a switch-mode power supply, the switch-mode power supply comprising:
  the bootstrap circuit; and
  a switching circuit comprising:
    a switch coupled between the first terminal of the bootstrap switch and the second terminal of the bootstrap capacitor; and a driver coupled to the switch, the driver comprising:
a positive supply terminal coupled to the second terminal of the bootstrap switch and the first terminal of the bootstrap capacitor; and
a negative supply terminal coupled to the second terminal of the bootstrap capacitor.

Aspect 14: The apparatus of aspect 13, wherein the switch comprises an n-channel metal-oxide-semiconductor field-effect transistor.

Aspect 15: The apparatus of aspect 13 or 14, wherein the bootstrap switch is configured to selectively:
be in an opposite state as the switch responsive to the input voltage being greater than a voltage threshold; or
be in the open state responsive to the input voltage being less than the voltage threshold.

Aspect 16: The apparatus of any one of aspects 13-15, wherein the switch-mode power supply is configured to:
be coupled between a power source and a load; and
transfer power from the power source to the load.

Aspect 17: The apparatus of any one of aspects 13-16, wherein the switch-mode power supply comprising an inductor coupled between the load and the second terminal of the bootstrap capacitor.

Aspect 18: The apparatus of any one of aspects 13-17, wherein the switch-mode power supply comprises a buck converter or a buck-boost converter.

Aspect 19: An apparatus comprising:
a bootstrap circuit comprising:
capacitance means for storing energy; and
switching means for charging the capacitance means, the switching means comprising:
a first terminal configured to accept an input voltage;
a second terminal coupled to the capacitance means; and
rectification means for charging the capacitance means based on the switching means being in an open state and providing a voltage at the second terminal that is greater than an average of the input voltage.

Aspect 20: The apparatus of aspect 19, wherein the switching means is configured to selectively:
be in a closed state to charge the capacitance means via an induced channel and cause the voltage at the second terminal to be at a first level; or
be in the open state to charge the capacitance means via the rectification means and cause the voltage at the second terminal to be at a second level that is greater than the first level.

Aspect 21: The apparatus of aspect 20, wherein:
the first level is approximately equal to the average of the input voltage; and
the second level is approximately equal to twice the average of the input voltage.

Aspect 22: The apparatus of any one of aspects 19-21, wherein:
the capacitance means comprises a first terminal and a second terminal, the first terminal coupled to the second terminal of the switching means; and
the apparatus comprises a switch-mode power supply, the switch-mode power supply comprising:
the bootstrap circuit; and
a switching circuit comprising:
a switch coupled between the first terminal of the switching means and the second terminal of the capacitance means; and
a driver coupled to the switch, the driver comprising:
a positive supply terminal coupled to the second terminal of the switching means and the first terminal of the capacitance means; and
a negative supply terminal coupled to the second terminal of the capacitance means.

Aspect 23: The apparatus of aspect 20, wherein the switching means is configured to selectively:
be in an opposite state as the switch responsive to the input voltage being greater than or equal to a voltage threshold; and
be in the open state responsive to the input voltage being less than the voltage threshold.

Aspect 24: A method for harvesting ringing energy, the method comprising:
accepting an input voltage at a first terminal of a bootstrap switch of a bootstrap circuit;
causing the bootstrap switch to be in an open state;
charging, based on the bootstrap switch being in the open state, a bootstrap capacitor of the bootstrap circuit using a body diode of the bootstrap switch, the body diode comprising an anode coupled to the first terminal and a cathode coupled to a second terminal of the bootstrap switch, the bootstrap capacitor coupled to the second terminal of the bootstrap switch; and
providing, based on the charging, a voltage at the second terminal of the bootstrap switch, the voltage greater than an average of the input voltage.

Aspect 25: The method of aspect 24, further comprising selectively:
operating the bootstrap switch in a closed state to charge the bootstrap capacitor using an induced channel; or
operating the bootstrap switch in the open state to charge the bootstrap capacitor using the body diode of the bootstrap switch.

Aspect 26: The method of aspect 25, wherein:
the operating of the bootstrap switch in the closed state comprises causing the voltage at the second terminal to be a first level; and
the operating of the bootstrap switch in the open state comprises causing the voltage at the second terminal to be a second level that is greater than the first level.

Aspect 27: The method of aspect 26, wherein:
the first level is approximately equal to the average of the input voltage; and
the second level is approximately equal to twice the average of the input voltage.

Aspect 28: The method of any one of aspects 25-27, further comprising monitoring the input voltage, wherein:
the operating of the bootstrap switch in the closed state comprises operating the bootstrap switch in the closed state responsive to the input voltage being greater than or equal to a voltage threshold; and
the operating of the bootstrap switch in the open state comprises operating the bootstrap switch in the open state responsive to the input voltage being less than the voltage threshold.

Aspect 29: The method of any one of aspects 24-27, further comprising providing the voltage to a positive supply terminal of a driver that drives a high-side switch of a switch-mode power supply.

Aspect 30: A switch-mode power supply comprising:
a switching circuit comprising:
a switch comprising a first terminal, a second terminal, and a third terminal; and
a driver comprising a positive supply terminal, a negative supply terminal coupled to the second terminal of the switch, and an output terminal coupled to the third terminal of the switch; and
a bootstrap circuit comprising:
a bootstrap capacitor comprising:
a first terminal coupled to the positive supply terminal of the driver; and
a second terminal coupled to the second terminal of the switch and the negative supply terminal of the driver; and
a bootstrap switch comprising:
a first terminal coupled to the first terminal of the switch;
a second terminal coupled to the first terminal of the bootstrap capacitor and the positive supply terminal of the driver; and
a body diode coupled between the first terminal and the second terminal of the bootstrap switch,
the bootstrap switch configured to be in an open state based on the switch being in the open state.

Aspect 31: The switch-mode power supply of aspect 30, wherein:
the bootstrap switch is configured to accept an input voltage at the first terminal of the bootstrap switch; and
the bootstrap circuit is configured to provide a voltage at the second terminal of the bootstrap switch that is greater than an average of the input voltage.

Aspect 32: The switch-mode power supply of aspect 31, wherein the bootstrap switch is further configured to be in the open state responsive to an input voltage at the first terminal of the bootstrap switch being less than a voltage threshold.

Aspect 33: The switch-mode power supply of aspect 32, wherein:
the bootstrap switch is further configured to be in an opposite state as the switch responsive to the input voltage being greater than the voltage threshold; and
the bootstrap circuit is configured to selectively:
provide a first voltage at the second terminal of the bootstrap switch that is approximately equal to an average of the input voltage responsive to the bootstrap switch being in the opposite state as the switch; and
provide a second voltage at the second terminal of the bootstrap switch that is approximately equal to twice the average of the input voltage responsive to the bootstrap switch being in the open state.

Aspect 34: The switch-mode power supply of any one of aspects 30-33, wherein the body diode comprises:
an anode coupled to the first terminal of the bootstrap switch; and
a cathode coupled to the second terminal of the bootstrap switch.

Aspect 35: The switch-mode power supply of any one of aspects 30-34, wherein:
the switch comprises an n-channel metal-oxide-semiconductor field-effect transistor; and
the bootstrap switch comprises a p-channel metal-oxide-semiconductor field-effect transistor.

What is claimed is:
1. An apparatus comprising:
a bootstrap circuit comprising:
a bootstrap capacitor; and
a bootstrap switch comprising:
a first terminal configured to accept an input voltage, the input voltage having voltage ringing that causes peaks of the input voltage to be greater than an average of the input voltage;
a second terminal coupled to the bootstrap capacitor; and
a body diode comprising an anode coupled to the first terminal and a cathode coupled to the second terminal,
the bootstrap switch configured to:
be in an open state to charge the bootstrap capacitor via the body diode; and
provide a voltage at the second terminal of the bootstrap switch, the voltage greater than the average of the input voltage.

2. The apparatus of claim 1, wherein the bootstrap switch is configured to charge the bootstrap capacitor via the body diode based on the voltage ringing being present in the input voltage.

3. The apparatus of claim 1, wherein an average of the voltage at the second terminal is approximately two times larger than the average of the input voltage.

4. The apparatus of claim 1, wherein the bootstrap switch is further configured to selectively:
be in a closed state to charge the bootstrap capacitor via an induced channel; or
be in the open state to charge the bootstrap capacitor via the body diode.

5. The apparatus of claim 4, wherein the bootstrap switch is configured to selectively:
cause the voltage at the second terminal to be at a first level responsive to being in the closed state to charge the bootstrap capacitor via the induced channel; or
cause the voltage at the second terminal to be at a second level responsive to being in the open state to charge the bootstrap capacitor via the body diode, the second level greater than the first level.

6. The apparatus of claim 5, wherein:
the first level is approximately equal to the average of the input voltage; and
the second level is approximately equal to twice the average of the input voltage.

7. The apparatus of claim 4, wherein the bootstrap circuit comprises a bootstrap driver circuit configured to:
monitor the input voltage; and
responsive to the input voltage being greater than a voltage threshold, cause the bootstrap switch to be in the closed state to charge the bootstrap capacitor via the induced channel; or
responsive to the input voltage being less than the voltage threshold, cause the bootstrap switch to be in the open state to charge the bootstrap capacitor via the body diode.

8. The apparatus of claim 1, wherein:
the bootstrap switch comprises a p-channel metal-oxide-semiconductor field-effect transistor comprising:
a drain terminal as the first terminal;
a source terminal as the second terminal; and
a gate terminal; and
the bootstrap switch is configured to operate in the open state responsive to the p-channel metal-oxide-semiconductor field-effect transistor being biased according to a cut-off region.

9. The apparatus of claim 8, wherein the bootstrap circuit comprises a bootstrap driver circuit configured to:
provide a gate voltage at the gate terminal of the p-channel metal-oxide-semiconductor field-effect transistor; and
cause the gate voltage to be greater than or equal to a voltage at the source terminal of the p-channel metal-oxide-semiconductor field-effect transistor to bias the p-channel metal-oxide-semiconductor field-effect transistor according to the cut-off region.

10. The apparatus of claim 9, wherein the bootstrap driver circuit is configured to connect the gate terminal of the p-channel metal-oxide-semiconductor field-effect transistor to the source terminal of the p-channel metal-oxide-semiconductor field-effect transistor to cause the gate voltage to be approximately equal to the voltage at the source terminal.

11. The apparatus of claim 1, wherein:
the bootstrap capacitor comprises:
  a first terminal coupled to the second terminal of the bootstrap switch; and
  a second terminal; and
the apparatus comprises a switch-mode power supply, the switch-mode power supply comprising:
  the bootstrap circuit; and
  a switching circuit comprising:
    a switch coupled between the first terminal of the bootstrap switch and the second terminal of the bootstrap capacitor; and
    a driver coupled to the switch, the driver comprising:
      a positive supply terminal coupled to the second terminal of the bootstrap switch and the first terminal of the bootstrap capacitor; and
      a negative supply terminal coupled to the second terminal of the bootstrap capacitor.

12. The apparatus of claim 11, wherein the switch comprises an n-channel metal-oxide-semiconductor field-effect transistor.

13. The apparatus of claim 11, wherein the bootstrap switch is configured to selectively:
be in an opposite state as the switch responsive to the input voltage being greater than a voltage threshold; or
be in the open state responsive to the input voltage being less than the voltage threshold.

14. The apparatus of claim 11, wherein the switch-mode power supply is configured to:
be coupled between a power source and a load; and
transfer power from the power source to the load.

15. The apparatus of claim 14, wherein the switch-mode power supply comprises an inductor coupled between the load and the second terminal of the bootstrap capacitor.

16. The apparatus of claim 11, wherein the switch-mode power supply comprises a buck converter or a buck-boost converter.

17. An apparatus comprising:
a bootstrap circuit comprising:
  capacitance means for storing energy; and
  switching means for charging the capacitance means, the switching means comprising:
    a first terminal configured to accept an input voltage, the input voltage having voltage ringing that causes peaks of the input voltage to be greater than an average of the input voltage;
    a second terminal coupled to the capacitance means; and
    rectification means for charging the capacitance means based on the switching means being in an open state and providing a voltage at the second terminal that is greater than the average of the input voltage, the rectification means comprising a body diode of the switching means.

18. The apparatus of claim 17, wherein the switching means is configured to selectively:
be in a closed state to charge the capacitance means via an induced channel and cause the voltage at the second terminal to be at a first level; or
be in the open state to charge the capacitance means via the rectification means and cause the voltage at the second terminal to be at a second level that is greater than the first level.

19. The apparatus of claim 18, wherein:
the first level is approximately equal to the average of the input voltage; and
the second level is approximately equal to twice the average of the input voltage.

20. The apparatus of claim 17, wherein:
the capacitance means comprises a first terminal and a second terminal, the first terminal coupled to the second terminal of the switching means; and
the apparatus comprises a switch-mode power supply, the switch-mode power supply comprising:
  the bootstrap circuit; and
  a switching circuit comprising:
    a switch coupled between the first terminal of the switching means and the second terminal of the capacitance means; and
    a driver coupled to the switch, the driver comprising:
      a positive supply terminal coupled to the second terminal of the switching means and the first terminal of the capacitance means; and
      a negative supply terminal coupled to the second terminal of the capacitance means.

21. The apparatus of claim 20, wherein the switching means is configured to selectively:
be in an opposite state as the switch responsive to the input voltage being greater than or equal to a voltage threshold; and
be in the open state responsive to the input voltage being less than the voltage threshold.

22. A method for harvesting ringing energy, the method comprising:
accepting an input voltage at a first terminal of a bootstrap switch of a bootstrap circuit, the input voltage having voltage ringing that causes peaks of the input voltage to be greater than an average of the input voltage;
causing the bootstrap switch to be in an open state;
charging, based on the bootstrap switch being in the open state, a bootstrap capacitor of the bootstrap circuit using a body diode of the bootstrap switch, the body diode comprising an anode coupled to the first terminal and a cathode coupled to a second terminal of the bootstrap switch, the bootstrap capacitor coupled to the second terminal of the bootstrap switch; and
providing, based on the charging, a voltage at the second terminal of the bootstrap switch, the voltage greater than the average of the input voltage.

23. The method of claim 22, further comprising selectively:
operating the bootstrap switch in a closed state to charge the bootstrap capacitor using an induced channel; or
operating the bootstrap switch in the open state to charge the bootstrap capacitor using the body diode of the bootstrap switch.

24. The method of claim 23, wherein:
the operating of the bootstrap switch in the closed state comprises causing the voltage at the second terminal to be a first level; and
the operating of the bootstrap switch in the open state comprises causing the voltage at the second terminal to be a second level that is greater than the first level.

25. The method of claim 24, wherein:
the first level is approximately equal to the average of the input voltage; and the second level is approximately equal to twice the average of the input voltage.

26. The method of claim 23, further comprising monitoring the input voltage, wherein:
the operating of the bootstrap switch in the closed state comprises operating the bootstrap switch in the closed state responsive to the input voltage being greater than or equal to a voltage threshold; and
the operating of the bootstrap switch in the open state comprises operating the bootstrap switch in the open state responsive to the input voltage being less than the voltage threshold.

27. A switch-mode power supply comprising:
a switching circuit comprising:
a switch comprising a first terminal, a second terminal, and a third terminal; and
a driver comprising a positive supply terminal, a negative supply terminal coupled to the second terminal of the switch, and an output terminal coupled to the third terminal of the switch; and
a bootstrap circuit comprising:
a bootstrap capacitor comprising:
a first terminal coupled to the positive supply terminal of the driver; and
a second terminal coupled to the second terminal of the switch and the negative supply terminal of the driver; and
a bootstrap switch comprising:
a first terminal coupled to the first terminal of the switch;
a second terminal coupled to the first terminal of the bootstrap capacitor and the positive supply terminal of the driver; and
a body diode coupled between the first terminal and the second terminal of the bootstrap switch,
the bootstrap switch configured to be in an open state based on the switch being in the open state and an input voltage at the first terminal of the bootstrap switch being less than a voltage threshold.

28. The switch-mode power supply of claim 27, wherein:
the bootstrap switch is configured to accept the input voltage at the first terminal of the bootstrap switch; and
the bootstrap circuit is configured to provide a voltage at the second terminal of the bootstrap switch that is greater than an average of the input voltage.

29. The switch-mode power supply of claim 28, wherein the input voltage has voltage ringing that causes peaks of the input voltage to be greater than the average of the input voltage.

30. The switch-mode power supply of claim 27, wherein:
the bootstrap switch is further configured to be in an opposite state as the switch responsive to the input voltage being greater than the voltage threshold; and
the bootstrap circuit is configured to selectively:
provide a first voltage at the second terminal of the bootstrap switch that is approximately equal to an average of the input voltage responsive to the bootstrap switch being in the opposite state as the switch; and
provide a second voltage at the second terminal of the bootstrap switch that is approximately equal to twice the average of the input voltage responsive to the bootstrap switch being in the open state.

* * * * *